United States Patent
Yang et al.

(10) Patent No.: US 9,048,675 B2
(45) Date of Patent: Jun. 2, 2015

(54) CHARGING CIRCUIT FOR CAPACITOR

(75) Inventors: Tse-Lung Yang, Yunlin County (TW); Hsiang-Chung Chang, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 743 days.

(21) Appl. No.: 13/409,109

(22) Filed: Mar. 1, 2012

(65) Prior Publication Data

US 2013/0181685 A1  Jul. 18, 2013

(30) Foreign Application Priority Data

Jan. 12, 2012  (TW) .............................. 101101215 A

(51) Int. Cl.
H02J 7/00 (2006.01)
H02J 7/34 (2006.01)

(52) U.S. Cl.
CPC ............... *H02J 7/0052* (2013.01); *H02J 7/345* (2013.01)

(58) Field of Classification Search
USPC ......................................... 320/160, 163, 166
See application file for complete search history.

(56) References Cited

U.S. PATENT DOCUMENTS

| | | | |
|---|---|---|---|
| 5,311,141 A * | 5/1994 | Umeyama et al. ............ 327/552 |
| 5,612,639 A | 3/1997 | Reynolds | |
| 6,753,720 B2 | 6/2004 | Kono | |
| 7,728,678 B2 | 6/2010 | Mitsui | |

FOREIGN PATENT DOCUMENTS

TW   I252949   4/2006

* cited by examiner

*Primary Examiner* — Arun Williams
*Assistant Examiner* — Aaron Piggush
(74) *Attorney, Agent, or Firm* — Winston Hsu; Scott Margo

(57) ABSTRACT

A charging circuit for a capacitor includes a current mirror module including a first branch circuit, a second branch circuit and a third branch circuit for supplying a plurality of output currents respectively, a switching module coupled to the first branch circuit and the second branch circuit for determining a conducting condition of the switching module according to the plurality of output currents from the first branch circuit and the second branch circuit, and an active loading circuit coupled to the third branch circuit and the switching module for adjusting a current passing through the active loading circuit according to the conducting condition of the switching module. The capacitor has one end coupled to the first branch circuit and the switching module to process a charging operation according to the output current of the first branch circuit.

7 Claims, 6 Drawing Sheets

CHARGING CIRCUIT FOR CAPACITOR

BACKGROUND OF THE INVENTION

1. Field of the Invention

The present invention relates to a charging circuit for a capacitor, and more particularly, to a charging circuit which utilizes an inversion capacitance and a depletion capacitance to determine a current ratio for charging a capacitor.

2. Description of the Prior Art

Generally, the Metal Oxide Semiconductor Field Effect Transistor (MOSFET) is formed from top to bottom as a metal layer, which is currently replaced by Polycrystalline Silicon, an oxide layer and a semiconductor layer (i.e. P-type or N-type Semiconductor) to form structurally a MOS transistor capacitor. The silicon dioxide ($SiO_2$) is usually utilized for the oxide layer to form a dielectric material of the capacitor. Thickness of the oxide layer and the dielectric constant of silicon dioxide are further utilized to determine capacitance of the capacitor. Last, the MOS transistor capacitor has the polycrystalline silicon as a gate and the semiconductor layer as abase to form two terminal ends for connection.

Please refer to FIG. 1A, FIG. 1B and FIG. 2, wherein FIG. 1A illustrates a schematic diagram of a conventional MOS transistor capacitor MOS_C for charging, FIG. 1B illustrates a schematic diagram of different operational conditions of the MOS transistor capacitor MOS_C versus different capacitances, and FIG. 2 illustrates a schematic diagram of a terminal voltage VC1 of the MOS capacitor MOS_C at different timings. As shown in FIG. 1A and FIG. 1B, the MOS transistor capacitor MOS_C utilizes a stable current source CS for continuously charging. Due to an increasing voltage value of a gate of the MOS transistor capacitor MOS_C, the MOS transistor capacitor MOS_C switches its capacitances between a depletion capacitance C_del or an inversion capacitance C_inv, which correspond to different operational conditions. Please refer to FIG. 2. Since the MOS transistor capacitor MOS_C can be either the depletion capacitance C_del or the inversion capacitance C_inv, the terminal voltage VC1 of the MOS transistor capacitor MOS_C corresponds to two lines with different slopes at the threshold voltage Vth. Under such circumstances, the capacitance of the MOS transistor capacitor MOS_C has dramatically changeable capacitances at the threshold voltage Vth. Therefore, it has become an important issue in the art to provide a charging circuit for a capacitor to avoid dramatically changeable or discontinuous capacitances of the MOS transistor capacitor MOS_C at the threshold voltage Vth.

SUMMARY OF THE INVENTION

It is therefore an objective of the invention to provide a charging circuit for a capacitor, and to operate a charging process for the capacitor.

The present invention discloses a charging circuit for a capacitor comprising a current-mirror module having a first branch circuit, a second branch circuit and a third branch circuit for providing a plurality of output currents respectively. A switching module is coupled to the first branch circuit and the second branch circuit for determining a conducting condition of the switching module according to the plurality of output currents of the first branch circuit and the second branch circuit. An active loading circuit is coupled to the third branch circuit and the switching module for adjusting a current passing through the active loading circuit according to the conducting condition of the switching module. One end of the capacitor is coupled to the first branch circuit and the switching module to perform a charging process according to the output current of the first branch circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
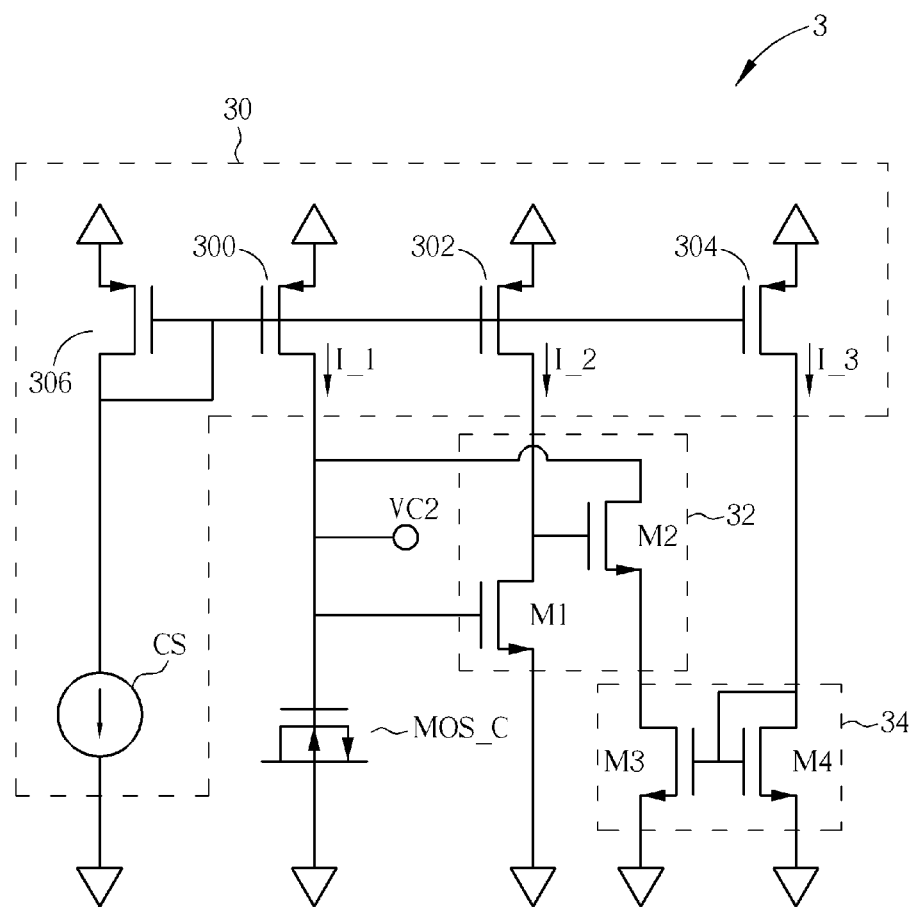
FIG. 3 illustrates a schematic diagram of a charging circuit according to an embodiment of the invention.

Please refer to FIG. 3, which illustrates a schematic diagram of a charging circuit 3 according to an embodiment of the invention. As shown in FIG. 3, the charging circuit 3 is utilized for a MOS transistor capacitor MOS_C to operate a charging process. The charging circuit 3 includes a current mirror module 30, a switching module 32 and an active loading circuit 34. The current mirror module 30 includes a first branch circuit 300, a second branch circuit 302, a third branch circuit 304 and a fourth branch circuit 306. The first branch circuit 300, the second branch circuit 302, the third branch circuit 304 and the fourth branch circuit 306 are realized by MOS transistors. According to a stable current source CS in series with the fourth branch circuit 306, the first branch circuit 300, the second branch circuit 302 and the third branch circuit 304 individually provide stable output currents I_1, I_2, I_3. The switching module 32 includes a first transistor M1 and a second transistor M2 to connect with the first branch circuit 300 and the second branch circuit 302 respectively. The active loading circuit 34 includes a third transistor M3 and a fourth transistor M4. A drain of the third transistor M3 is connected with a source of the second transistor M2. A drain and a gate of the fourth transistor M4 are connected with the third branch circuit 304. A gate of the MOS transistor capacitor MOS_C is connected with the first branch circuit 300 and the switching module 32 simultaneously, and outputs via a terminal voltage VC2. These mentioned circuits can be realized via combination or replacement of similar elements/units, and are not limited the scope of the invention.

Additionally, according to process features of composing elements, the circuit designer has the inversion capacitance C_inv and the depletion capacitance C_del of the MOS transistor capacitor MOS_C in advance, and further presets an area ratio for the third transistor M3 and the fourth transistor M4 of the active loading circuit 34. For example, a ratio of the inversion capacitance C_inv to the depletion capacitance C_del is 3:1, and thereby the area ratio of the third transistor M3 and the fourth transistor M4 is 2/3 according to a formula of (C_inv−C_del)/C_del. Accordingly, a current ratio is determined to adjust a current passing through the third transistor M3. The output current I_1 of the first branch circuit 300 is also utilized to control conducting conditions of the first transistor M1 and the second transistor M2 of the switching module 32, so as to generate a charging waveform with a constant slope to perform the charging process for the MOS transistor capacitor MOS_C.

Figure 1A:
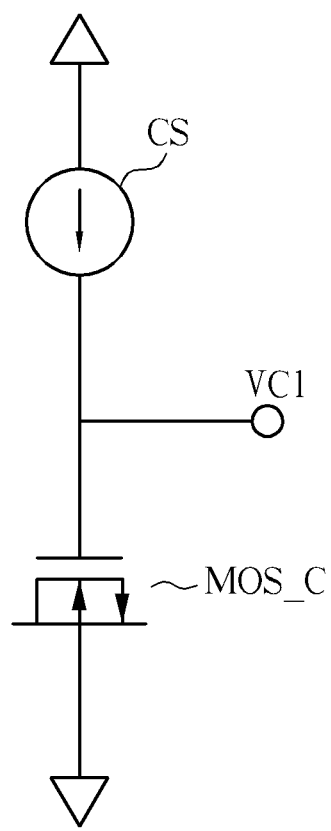
FIG. 1A illustrates a schematic diagram of a conventional MOS transistor capacitor for charging.
Figure 1B:
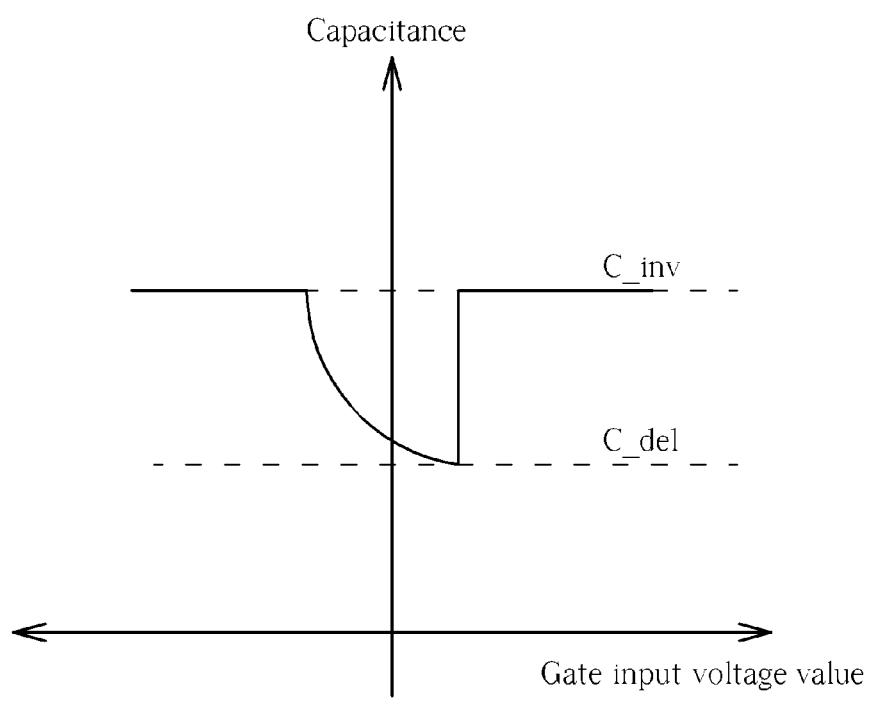
FIG. 1B illustrates a schematic diagram of different operational conditions of the MOS transistor capacitor versus different capacitances.
Figure 2:
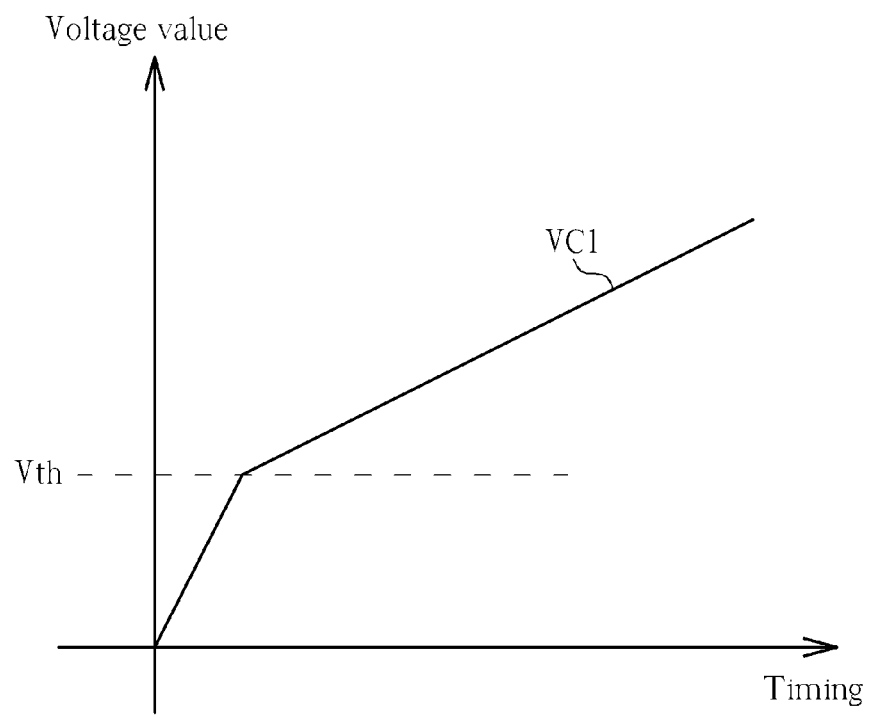
FIG. 2 illustrates a schematic diagram of a terminal voltage VC1 of the MOS capacitor at different timings.
Figure 4:
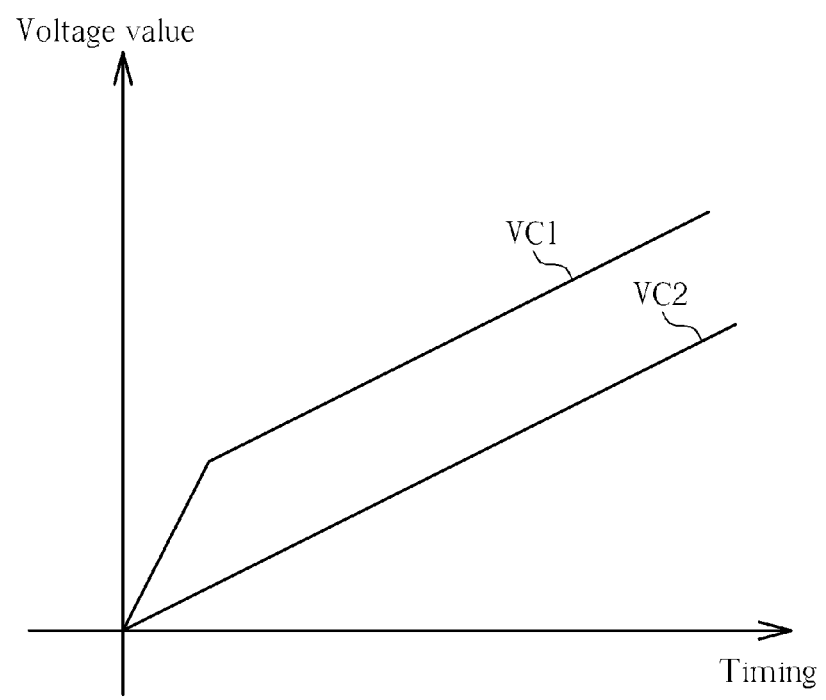
FIG. 4 illustrates a comparison diagram between the terminal voltage VC2 in FIG. 3 and the terminal voltage VC1 in FIG. 1A or FIG. 1B.

Please refer to FIG. 4, which illustrates a comparison diagram between the terminal voltage VC2 in FIG. 3 and the terminal voltage VC1 in FIG. 1A or FIG. 1B. In this embodiment of the invention, with increasing of the terminal voltage VC2, the first transistor M1 has not conducted yet and the second transistor has conducted. According to the current ratio 2/3, the output current I_1 of the first branch circuit 300 is adjusted to have corresponding currents passing through the MOS transistor capacitor MOS_C and the active loading circuit 34 with a ratio of 1/2. In other words, 1/3 of the output current I_1 passes through the MOS transistor capacitor MOS_C and 2/3 of the output current I_1 passes through the third transistor M3. In comparison with the terminal voltage VC1 of the prior art, the charging circuit 3 generates a smaller charging current passing through the gate of the MOS transistor capacitor MOS_C, and the smaller charging current provides a much more gradual slope for charging the MOS transistor capacitor MOS_C. When the terminal voltage VC2 increases to have the situation that the first transistor M1 conducts and the second transistor M2 does not conduct, i.e. the MOS transistor capacitor MOS_C operates at the threshold voltage Vth, the output current I_1 of the first branch circuit 300 totally inputs into the gate of the MOS transistor capacitor MOS_C, and none of the output current I_1 passes through the third transistor M3 of the active loading circuit 34. Under such circumstances, the terminal voltage VC2 has restored to an original current which is identical to the current passing through the terminal voltage VC1, and changes to the original charging slope to perform the charging process for the MOS transistor capacitor MOS_C.

The charging circuit 3 of the invention controls the conducting conditions of the transistor M1 and the second transistor M2 according to the output current I_1 of the first branch circuit 300. The charging circuit 3 adjusts the conducting current passing through the MOS transistor capacitor MOS_C being smaller than the threshold voltage Vth, so as to reduce the charging slope of the MOS transistor capacitor MOS_C. Once the MOS transistor capacitor MOS_C operates above the threshold voltage Vth, the charging slope is restored to the original slope and two stages of the charging process for the MOS transistor capacitor MOS_C are performed. Therefore, those skilled in the art can additionally install or modify other logic/comparison circuits to combine with the charging circuit 3 of the invention, to adaptively adjust the charging current passing through the MOS transistor capacitor MOS_C indifferent situations, such as different threshold voltage Vth, other specific conducting voltages or different conducting timings, which is within the scope of the invention.

Figure 5:
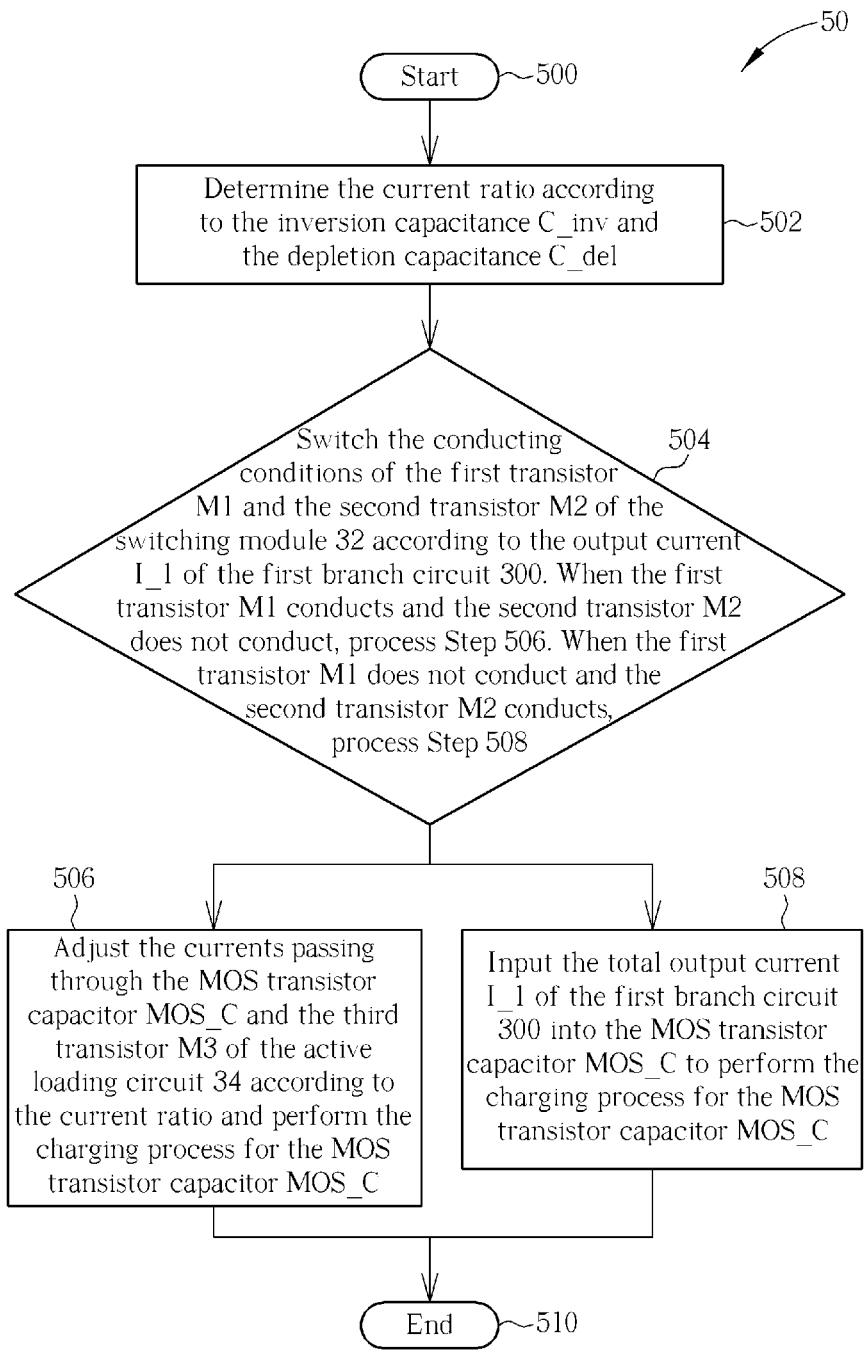
FIG. 5 illustrates a flow chart of a charging process according to an embodiment of the invention.

Noticeably, the embodiment of the invention provides the charging circuit 3 to perform the charging process for the MOS transistor capacitor MOS_C, which can be summarized as a charging process 50, as shown in FIG. 5. The charging process 50 includes the steps as following:

Step 500: Start.

Step 502: Determine the current ratio according to the inversion capacitance C_inv and the depletion capacitance C_del.

Step 504: Switch the conducting conditions of the first transistor M1 and the second transistor M2 of the switching module 32 according to the output current I_1 of the first branch circuit 300. When the first transistor M1 conducts and the second transistor M2 does not conduct, process Step 506. When the first transistor M1 does not conduct and the second transistor M2 conducts, process Step 508.

Step 506: Adjust the currents passing through the MOS transistor capacitor MOS_C and the third transistor M3 of the active loading circuit 34 according to the current ratio and perform the charging process for the MOS transistor capacitor MOS_C.

Step 508: Input the total output current I_1 of the first branch circuit 300 into the MOS transistor capacitor MOS_C to perform the charging process for the MOS transistor capacitor MOS_C.

Step 510: End.

The charging process 50 can be understood in the related paragraphs of the charging circuit 3, FIG. 3 and FIG. 4, and is not described hereinafter for simplicity. Noticeably, the charging process 50 utilizes the switching module 32 in Step 506 and Step 508 to dynamically adjust the charging current of the MOS transistor capacitor MOS_C, to generate a continuous charging slope. In comparison, the prior art cannot provide the slope of the charging waveform in advance, and is a disadvantage for the user who connects charging circuits serially as latter circuits.

In summary, the charging circuit of the invention utilizes a current mirror to generate a plurality of output currents and a switching module to switch on/off a plurality of switches, like the first transistor or the second transistor in the embodiment, and to adaptively adjust a current passing through the MOS transistor capacitor, so as to provide a continuous charging slope for the MOS transistor capacitor to perform a charging process, which has no needs to increase an area of the MOS transistor capacitor at additional costs and avoids damages dues to instant currents passing through the MOS transistor capacitor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging circuit for a capacitor comprising:
a current mirror module comprising a first branch circuit, a second branch circuit and a third branch circuit for providing a plurality of output currents respectively;
a switching module coupled to the first branch circuit and the second branch circuit for determining a conducting condition of the switching module according to the plurality of output currents of the first branch circuit and the second branch circuit; and
an active loading circuit coupled to the third branch circuit and the switching module for adjusting a current passing through the active loading circuit according to the conducting condition of the switching module;
wherein one end of the capacitor is coupled to the first branch circuit and the switching module to perform a charging process according to the output current of the first branch circuit;
wherein the switching module further comprises a first transistor and a second transistor to determine the conducting conditions of the first transistor and the second transistor according to the plurality of output currents of the first branch circuit and the second branch circuit.

2. The charging circuit of claim 1, wherein the first branch circuit, the second branch circuit and the third branch circuit individually comprise a transistor to provide a plurality of output currents according to a stable current source.

3. The charging circuit of claim 1, wherein when the first transistor does not conduct and the second transistor conducts, a portion of the output current of the first branch circuit is transmitted to the capacitor and the active loading circuit according to a current ratio.

4. The charging circuit of claim 3, wherein the capacitor is a MOS transistor having an inversion capacitance value and a depletion capacitance value, and the current ratio is determined by the inversion capacitance value and the depletion capacitance value.

5. The charging circuit of claim 3, wherein the active loading circuit further comprises a third transistor, and when the first transistor does not conduct and the second transistor conducts, a current passing through the third transistor is adjusted according to the current ratio.

6. The charging circuit of claim 5, wherein the active loading circuit further comprises a fourth transistor coupled to the third branch circuit and the third transistor.

7. The charging circuit of claim 1, wherein when the first transistor conducts and the second transistor does not conduct, all the output current of the first branch circuit passes through the capacitor.

\* \* \* \* \*